United States Patent [19]

Matsunaga et al.

[11] Patent Number: 5,258,829
[45] Date of Patent: Nov. 2, 1993

[54] COLOR DISPLAY APPARATUS FOR USE WITH INPUT SIGNALS HAVING DIFFERENT COLOR REPRODUCTION CHARACTERISTICS

[75] Inventors: Osamu Matsunaga; Masayuki Aiba, both of Kanagawa, Japan

[73] Assignee: Sony Corporation, Tokyo, Japan

[21] Appl. No.: 852,728

[22] Filed: Mar. 17, 1992

[30] Foreign Application Priority Data

Mar. 19, 1991 [JP] Japan ............... 3-PO81011/91

[51] Int. Cl.$^5$ ............................................. H04N 9/64
[52] U.S. Cl. .............................. 358/30; 358/527
[58] Field of Search ............. 358/21 R, 23, 25, 80, 358/11, 27–30

[56] References Cited

U.S. PATENT DOCUMENTS

| | | | |
|---|---|---|---|
| 4,267,560 | 5/1981 | Ishikawa et al. | 358/22 BP |
| 4,481,529 | 11/1984 | Kerling | 358/30 |
| 4,707,727 | 11/1987 | Penney | 358/30 X |
| 4,989,080 | 1/1991 | Ito | 358/80 |
| 4,994,901 | 2/1991 | Parulski et al. | 358/21 R X |
| 5,150,206 | 9/1992 | Roberts | 358/30 |

Primary Examiner—Mark R. Powell
Attorney, Agent, or Firm—Lewis H. Eslinger; Jay H. Maioli

[57] ABSTRACT

$R_1$, $G_1$ and $B_1$ outputs from a MUSE decoder 10 are entered to a color conversion section 11. In the color converting section, the $R_1$, $G_1$ and $B_1$ signals are entered to a camera gamma inverse correcting circuit 12 and then supplied via this circuit 12 to a color conversion matrix processing section 13. A coefficient supplied to this circuit 143 is changed depending on the input signals. Color conversion is effected depending on the supplied coefficient so that three color signals $R_4$, $G_4$ and $B_4$ are outputted and displayed on a CRT 15 via an inverse gamma characteristics circuit 14 of the display device. Image color signals with plural different color reproduction characteristics may be reproduced without color reproduction errors by a single color display apparatus.

5 Claims, 4 Drawing Sheets

COLOR DISPLAY APPARATUS FOR USE WITH INPUT SIGNALS HAVING DIFFERENT COLOR REPRODUCTION CHARACTERISTICS

BACKGROUND OF THE INVENTION

1. Field of the Invention

This invention relates to a color display apparatus for enabling color reproduction capable of dealing with all of supplied image signals in the display of image signals having reference white colors and/or image pickup characteristics associated with plural different color reproducing regions.

2. Description of the Related Art

In color television receivers in general, color reproduction is achieved by additive mixing of three prime colors. The color television receivers have color reproduction characteristics based on colorimetry or colorimetric parameters. By these color reproduction characteristics, appropriate color reproduction is achieved by the receiver over a wide range using parameters such as chromaticity points of reference white and three prime colors on the receiver side. To this end, various color reproduction methods have been proposed.

For indicating colors of an object or a light source by these various color reproducing methods, chromaticity points are indicated by points of intersection on an xy chromaticity diagram represented by CIE chromaticity coordinates (x, y). The colors of a light source or an object may be indicated by three prime colors on the receiver side, namely red (R), green (G) and blue (B), and reference white.

A standard C light source by CIE is adopted in, for example, the NTSC system, which is one of the current color television systems.

This standard C light source is among lights the relative spectral distribution of which is prescribed by CIE as a standard illumination employed for displaying colors of objects and is an ordinary daylight within a visible wavelength range having a correlative color temperature approximately equal to 6774K.

Recently, for obviating the above mentioned problems inherent in the television systems, a variety of new television systems have been investigated and proposed. One of such proposed systems is a high definition television system (HDTV system) proposed by Japan Broadcasting Corporation (NHK).

Among the specifications for HDTV system, studio standards are presently investigated by Comite Consultatif Internationale des Radio Communications (CCIR). A CCIR report 801 was proposed as recommendations in 1986. Under these recommendations, investigations were conducted by the Broadcasting Technology Association (BTA) and the Society of Motion Picture and Television Engineers of America (SMPTE) and the studio standards were completed except a part of digital standards. The studio standards were publicized as BTA-S001, while the studio standards by CCIR were publicized as recommendations by CCIR REC XA/11.

Meanwhile, the color reproduction regions are different for each of the television systems, such as the above mentioned current television systems or the HDTV system.

Consequently, if signals of the different color systems are entered to a television receiver, colors displayed on the screen are different from those intended to be displayed, i.e. color reproduction errors are produced.

Figure 2:
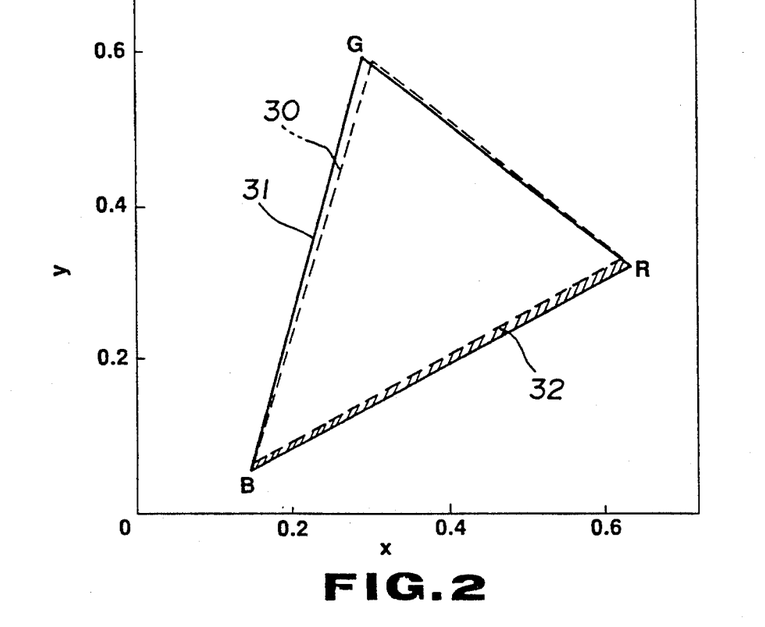
FIG. 2 is an xy chromaticity diagram showing a color reproduction region under BTA-S001 standard and a color reproduction region under a standard by the recommendations by CCIR REC XA/11.

Referring to FIG. 2, a color reproducing region 30 of the BTA standards and a color reproducing region 31 of the standards by CCIR REC XA/11, formulated with a view to global standard unification, are different from each other, despite the fact that they are both the standards for high definition television system, that is, these regions 30, 31 have different chromaticity points for the three prime colors. Therefore, even supposing that unification could be achieved in future, the problem of color reproduction errors is raised during the transition period.

Figure 5:
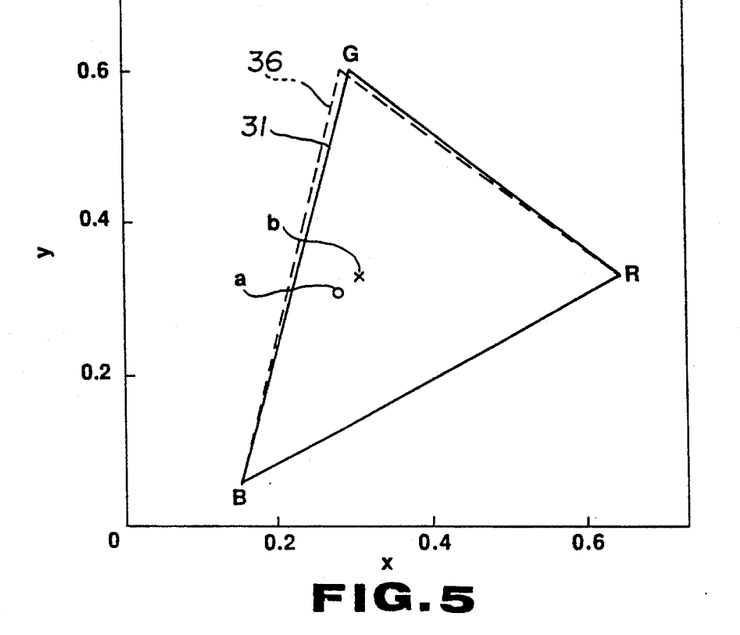
FIG. 5 is an xy chromaticity diagram under the current NTSC standards and a color reproduction region under the recommendations by CCIR REC XA/11.

On the other hand, if the color reproducing regions are different among different broadcasting systems, as indicated by a region 33 of a current television standard system, such as NTSC system, and a region 31 of the standard under the recommendations by CCIR REC XA/11, or if images having different image pickup characteristics, as indicated by a region 36 represented by the current television standard system by EBU (NTSC system) and the region 31 of the standard under the recommendations by CCIR REC XA/11, as shown in FIG. 5, are displayed simultaneously by the same television receiver, the reference white of the region 33 of the current television standard system, such as NTSC system, at point a, is different from the reference white of the region 32 of the standard under the recommendations by CCIR REC XA/11, at point b, so that color reproduction errors are produced.

OBJECTS AND SUMMARY OF THE INVENTION

In view of the above explained status of the art, it is an object of the present invention to provide a color display apparatus in which color reproduction may be achieved by a single color display apparatus without producing color reproduction errors on reception of input image signals having different plural color reproduction characteristics. To this end, three color chromaticity points and reference white colors having a broader one of different color reproduction regions are adopted. Besides, when different images having at least two different image pickup characteristics are simultaneously displayed by a screen surface dividing technique, such as picture-in-picture type screen surface dividing technique, on one and the same color television receiver, the color conversion matrices are switched on the real time basis using the screen dividing information.

In accordance with the present invention, there is provided a color display apparatus for displaying image signals having image pickup characteristics associated with plural different color reproduction regions, wherein color reproducing means are used, said color reproducing means having three color chromaticity points associated with the broadest one of said color reproduction regions including at least all of the color reproducing regions, and wherein input image signals are displayed by said color display means by means of a color conversion section for associating the input image signals with said color reproduction regions.

In the case of a color display apparatus for displaying image signals having plural different reference white colors on the receiving side, input image signals are displayed by the color display means via the color converting section adapted to display the input image signals in association with the respective reference white colors. In the case of a color display apparatus for displaying image signals having image pickup characteristics associated with plural different reference white colors, input image signals are displayed by the color reproducing means via the color converting section which is adapted for displaying the input image signals in association with the respective reference white colors.

The color converting section includes a color matrix processor having a variable coefficient.

The color converting section is made up of an inverse correcting circuit for performing inverse correction of gamma characteristics of a television camera, a color matrix processing section having a variable coefficient, and an inverse correction circuit for performing inverse correction of gamma characteristics of the display device.

If, in the above color display apparatus, image signals having image pickup characteristics associated with plural different color reproduction characteristics are displayed simultaneously with screen division, the color matrix processing section provided in the color converting section effects control of the coefficient for matrix processing based on the screen dividing information for displaying imaging signals free of color reproduction errors.

In this manner, with the color display apparatus according to the present invention, when image signals having image pickup characteristics associated with plural different color reproduction regions of e.g. the current NTSC system or high definition television system are entered, the coefficient of the color conversion matrix is changed for producing color reproduction regions associated with the respective systems to reproduce the colors on the screen without color reproduction errors. If there is a monitor television receiver for displaying plural standards for reference white colors on the receiver side, the input video signals are turned into image signals associated with reference white of the monitor television by a color converting section for display on the television screen.

When image signals having plural different reference white colors are entered, these may be turned into image signals associated with the reference white colors of the monitor television by effectuating color conversion in conformity to image signals based on the standards of the reference white color of the monitor television.

With the above described color conversion section, having a color matrix processing section having a variable coefficient, when image signals having image pickup characteristics associated with plural different color reproduction regions, image signals having plural different reference white colors on the receiving side or image signals having image pickup characteristics associated with plural different reference white colors, are entered, the coefficients of the color conversion matrix are changed for producing color reproduction regions associated with the respective systems to reproduce the colors on the screen without color reproduction errors.

When image signals having image pickup characteristics associated with plural different color reproduction regions, image signals having plural different reference white colors on the receiving side or image signals having image pickup characteristics associated with plural different reference white colors, are displayed simultaneously on the same screen, the coefficient of the color matrix processing is controlled by switching based on the screen dividing information so that color reproduction may be achieved on the screen without color reproduction errors in association with the supplied image signals.

DETAILED DESCRIPTION OF THE PREFERRED EMBODIMENTS

A first embodiment of a color display apparatus according to the present invention is hereinafter explained by referring to the block diagram of FIG. 1 and chromaticity diagrams of FIGS. 2 and 3.

If inspected minutely, the color reproduction region of the BTA-S001 studio standard is narrower than that of the standard under the recommendations by CCIR REC XA/11, so that, with the color reproduction region according to the BTA-S001 studio standard, shown by hatching in FIG. 2, input signals of the region 31 under the recommendations by CCIR REC XA/11 can not be reproduced accurately.

Thus, for associating the input image signals with each of the color reproduction regions, the chromaticity points or the three prime colors of the standard under the recommendations by CCIR REC XA/11, are adopted in effecting color conversion, using color reproducing means, namely phosphors, color filter or light source, having the chromaticity points for the three prime colors associated with the broadest color reproduction region inclusive of at least the totality of the color reproduction regions of the input image signals.

That is, color reproducing means having three color chromaticity points associated with the broadest one of the different color reproducing regions including at least all of the color reproducing regions of the image signals is employed. These color reproducing means include phosphors associated with pixels, a color filter, and a light source for a screen comprising the three chromaticity points. For associating the input image signals with the respective color reproducing regions by using the color reproducing means, three color-chromaticity points of the standard based on the recommendations by the CCIR REC XA/11 having the broadest color reproducing regions are used to effect color conversion.

Figure 1:
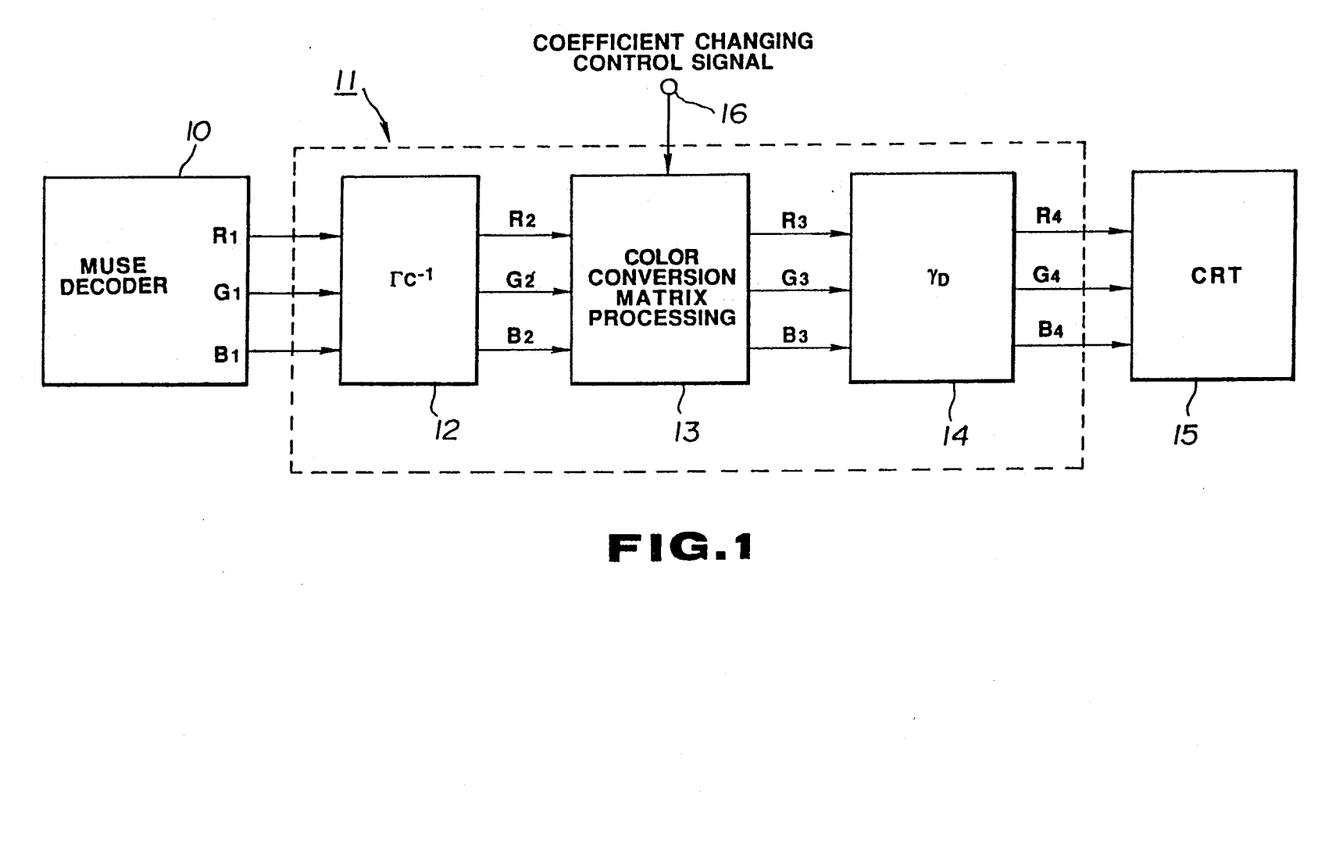
FIG. 1 is a block circuit diagram showing an embodiment of a color display apparatus according to the present invention for effecting color conversion.

Referring to FIG. 1, three prime color signals $G_1$, $B_1$ and $R_1$ as transmission prime color signals are supplied to a color conversion section 11. These three prime color signals $G_1$, $R_1$ and $B_1$ are supplied to the color conversion section 11 from a decoder 10 of a so-called multi sub-Nyquist sampling encoding system (MUSE system) employed at the receiving side, as shown for example in FIG. 1.

The function of the color conversion section 11 is to cause the input image signals to be adapted to the respective color reproduction regions. The color conversion section 11 is made up of an inverse gamma correction circuit 12, a color conversion matrix processor 13 and an inverse gamma correction circuit 14.

The inverse gamma correction circuit 12 effects inverse correction of gamma characteristics of a television camera. The color conversion matrix processor 13 is provided with a variable coefficient for a color matrix processing operation. The inverse gamma correction circuit 14 effects inverse correction of gamma characteristics of a display device.

The three prime color signals $R_1$, $G_1$ and $B_1$ as transmission prime color signals are first transmitted to the inverse correction circuit 12 of the color conversion section 11.

The function of the gamma correction circuit is to process the three prime color signals $R_1$, $G_1$ and $B_1$ by camera gamma correction $\Gamma_c^{-1}$ for restoring these signals to linear signals. The three prime color signals $R_2$, $G_2$ and $B_2$ outputted from the inverse correction circuit 12 are transmitted to a color conversion matrix processor 13 constituted by a color matrix processor having a variable coefficient for effecting an association with the color reproduction regions.

A control signal for changing the coefficient supplied to the color conversion matrix circuit 13 from outside is supplied via an input terminal 16 to the color conversion matrix processor 13 to effect color conversion. Three prime color signals $R_3$, $G_3$ and $B_3$, outputted from the color conversion matrix processor 13, are supplied to the inverse gamma correction circuit 14 of a display device, such as CRT.

The inverse gamma characteristics $\gamma_D$ of the display device is applied in the inverse gamma correction circuit 14 of the display device to effect correction with respect to the display device. Outputs from the inverse gamma correction circuit 14 of the display device are supplied to a CRT as the display device 14, for effecting display on the screen. The output signals are three prime color signals $R_4$, $G_4$ and $B_4$.

If the input signals exhibit image pickup characteristics associated with the color reproduction region under the recommendations by CCIR REC XA/11, the coefficients supplied from outside to the color conversion matrix processor 13 need not be changed with respect to color conversion by the processor 13. Thus the conversion matrix constituted by the coefficient supplied at this time is a unit matrix.

On the other hand, if the input signals are of image pickup characteristics associated with the BTA-S001 studio standard color reproduction region 30, as shown in FIG. 2, the coefficient supplied to the color conversion matrix processor 13, supplied from outside, needs to be changed.

The coefficient of the color matrix, supplied from outside, may be found in the following manner.

First, with the three prime color signals R, G and B in accordance with the recommendations of CCIR REC XA/11, the chromaticity of the three colors and that of reference white are defined in the following manner.

TABLE 1

| CHROMA-TICITY OF THREE COLOR | STANDARDS | | | |
|---|---|---|---|---|
| | BTA-S001 CHROMATICITY (x, y) | | CCIR REC XA/11 COORDINATES (x, y) | |
| | x | y | x | y |
| R | 0.630 | 0.340 | 0.640 | 0.330 |
| G | 0.310 | 0.595 | 0.300 | 0.600 |
| B | 0.155 | 0.070 | 0.150 | 0.060 |
| REFERENCE WHITE | 0.3127 | 0.3290 | 0.3127 | 0.3290 |

Since the reference white of the BTA-S001 studio standard and that of the recommendations by CCIR REC XA/11 are the same as the standard light C, the three color signals R, G and B of the color reproducing system according to the recommendations by CCIR REC XA/11 may be found from the formula 1 as tristimulus values $X_1$, $Y_1$ and $Z_1$ expressed by the XYZ colorimetric system for the luminosity of the reference white color equal to unity.

The sequence of finding matrix components of a three-row three column matrix shown at the right side of formula 1, is explained briefly.

Since the sum of the chromaticity coordinates is unity, the chromaticity coordinates may be expressed by two-dimensional values, as shown in Table 1. A chromaticity value z is found from chromaticity values of the chromaticity coordinates (x, y) shown in Table 1. In the conversion of the colorimetric system, the chromaticity coordinates of the tristimulus values $X_1$, $Y_1$ and $Z_1$, represent chromaticity coordinates of the colorimetric system prior to conversion. These chromaticity coordinates are the first chromaticity coordinates. For each prime color, the first or original chromaticity coordinates are expressed by $(x_R, y_R, z_R)$, $(x_G, y_G, z_G)$, $(x_B, y_B, z_B)$.

A three-row three-column matrix is constituted on the basis of the values of the first chromaticity coordinates (chromaticity values).

The conversion of the colorimetric system is performed by the technique of coordinate conversion or transform. As variables used in the conversion formula, the first tristimulus values or three color signals $X_1$, $Y_1$ and $Z_1$, the values of the chromaticity coordinates $x_W$, $y_W$, $z_W$, basic stimulus values $X_W$, $Y_W$, $Z_W$, which are the quantities of the three prime colors necessary for color equation to a reference white, and a sum stimulus which is the sum of the basic stimulus values (three prime colors), are used to set a formula. In order that conditions for an equicolor relation may be perpetually satisfied, the first tristimulus values X, Y and Z must be equal to the coefficients of the second tristimulus values R, G and B after the conversion of the colorimetric system. Solving the formula with respect to the second tristimulus values R, G and B the components of the three-row three-column matrix of the formula 1 may be found.

The formula (1) for conversion into the colorimetric system of the three prime colors R, G and B of the color reproduction system according to the recommendations of CCIR REC XA/11, on the basis of the thus obtained values, is given by $$\begin{bmatrix} R \\ G \\ B \end{bmatrix}_{CCIR} = \begin{bmatrix} 3.2430 & -1.5383 & -0.4989 \\ -0.9690 & 1.8755 & 0.0415 \\ 0.0557 & -0.2041 & 1.0577 \end{bmatrix} \begin{bmatrix} X_1 \\ Y_1 \\ Z_1 \end{bmatrix} \quad (1)$$

On the other hand, signals conforming to BTA-001 studio standards may be represented by the following formula (2) for conversion into the colorimetric system by calculation based on the chromaticity values of Table 1.

$$\begin{bmatrix} R \\ G \\ B \end{bmatrix}_{BTA} = \begin{bmatrix} 3.5083 & -1.7409 & -0.5444 \\ -1.0687 & 1.9772 & 0.0352 \\ 0.0563 & -0.1971 & 1.0507 \end{bmatrix} \begin{bmatrix} X_2 \\ Y_2 \\ Z_2 \end{bmatrix} \quad (2)$$

Therefore, if the two signals represent the same color, the three-row one-column matrix on the right side of formula (1) is equal to the three-row one-column matrix of formula (2), that is, $X_1=X_2$, $Y_1=Y_2$ and $Z_1=Z_2$ hold. Thus the tristimulus values $X_2$, $Y_2$ and $Z_2$ in the studio standard may be obtained by inverse conversion of the formula (2). By substituting these values into formula (1), a formula (3) for converting the input BTA-001 studio standard image signals into image signals under the recommendations of CCIR REC XA/11 is obtained.

$$\begin{bmatrix} R \\ G \\ B \end{bmatrix}_{CCIR} = \begin{bmatrix} 0.9395 & 0.0502 & 0.0103 \\ 0.0177 & 0.9658 & 0.0164 \\ -0.0016 & -0.0044 & 1.0060 \end{bmatrix} \begin{bmatrix} R \\ G \\ B \end{bmatrix}_{BTA} \quad (3)$$

With respective components of the three-row three-column matrix on the right side of the formula (3), when BTA-001 studio standard signals are entered, color reproduction adapted to the region 31 of the standard under the recommendations by CCIR REC XA/11 is achieved.

Since the same reference white is used in the two standards as may be seen from Table 1, it is unnecessary to perform such adaptive conversion by the color conversion matrix processor 13 of the color conversion section 11 adapted for displaying the image signals associated with the different reference white colors in conformity to these reference white colors.

With the present color display device, colors corresponding to image pickup characteristics associated with different plural color reproduction regions or reference white colors may be reproduced by displaying image signals after color conversion for association with the color reproduction regions is effectuated using phosphors, color filters or light source which are employed for color reproduction and which are provided with three color chromaticity points associated with the broadest color reproduction region inclusive of at least all of the color reproduction regions of the input image signals.

Figure 3:
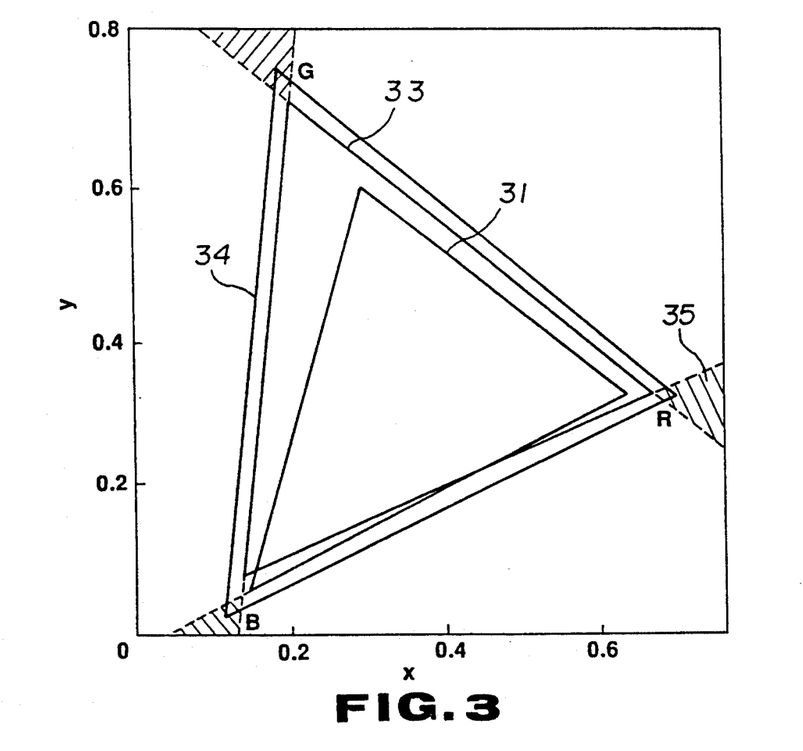
FIG. 3 is a block circuit diagram showing another embodiment of the present invention for effecting color conversion based on a screen dividing information for a color display apparatus.

On the other hand, in a color display apparatus for displaying the region 33 indicated by the specifications of the NTSC system, as one of the current television systems, and the region 31 indicated by the standard based on the recommendations by CCIR REC XA/11 of the HDTV system, as shown in FIG. 3, one of the above mentioned two color reproduction regions is not approximately inclusive of the other color reproduction region, as mentioned previously.

Thus a new color reproduction region 34, indicated by three prime color chromaticity points totally including the color reproduction regions 31, 33, as shown in FIG. 3, is adopted. It suffices if the three prime color chromaticity points include at least the color reproduction regions and may be broader than these regions. This means that the three prime color chromaticity points may be in a hatched area 35 near each apex of the triangle or on broken lines in FIG. 3.

Since the color reproduction region is completely inclusive of the color reproduction region 33 of the NTSC system and the color reproduction region 31 under the recommendations by CCIR REC XA/11 of the HDTV system, colors of the two systems may be reproduced without color reproduction errors by effecting color conversion on the basis of the new three color chromaticity points totally inclusive of the two color reproduction regions.

The color conversion section is of the same construction as that shown in a block diagram of FIG. 1. Although particular coefficient values of the color conversion matrix to be supplied to the color conversion matrix processor in the color conversion section are not given herein, they may be obtained by matrix processing from the chromaticity points of the three prime colors and the reference white colors of the NTSC system and the HDTV system and the newly adopted chromaticity points of the three prime colors and the reference white colors.

Figure 4:
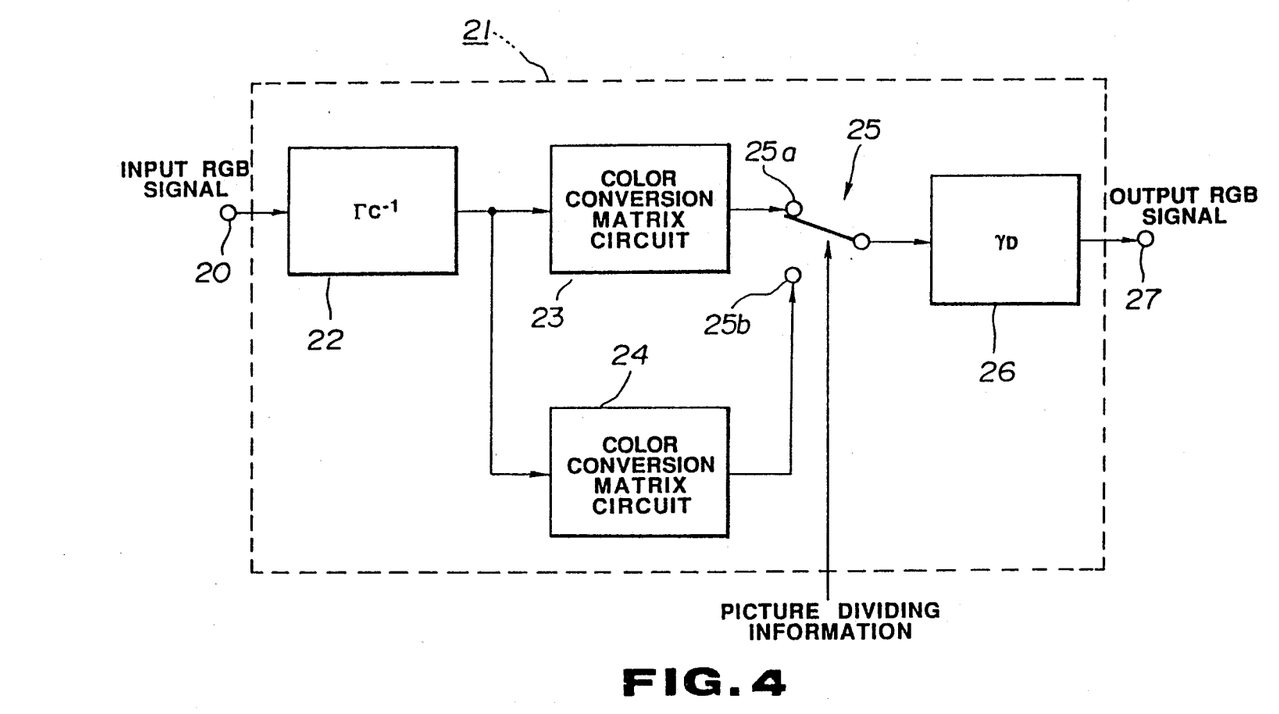
FIG. 4 is an xy chromaticity diagram showing color reproduction regions completely including both the color reproduction region under BTA-S001 standard and the color reproduction region under a standard under the recommendations by CCIR REC XA/11.
Figure 6:
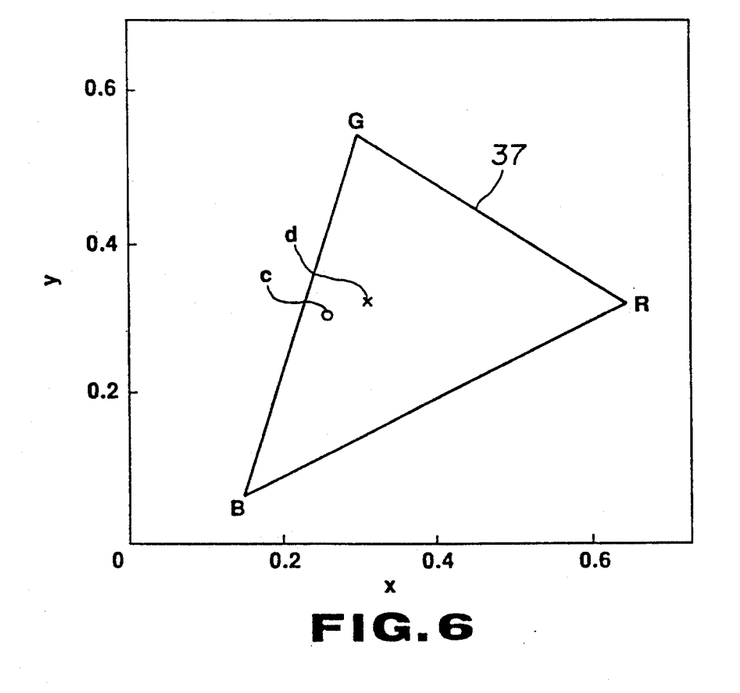
FIG. 6 is an xy chromaticity diagram in which reference white colors of image signals having image pickup characteristics associated with the plural different reference white colors are plotted.

A second embodiment of the color display apparatus of the present invention is explained by referring to the block view of FIG. 4 and xy chromaticity diagrams of FIGS. 5 and 6.

The three color chromaticity points according to EBU standards are adopted in NTSC system receivers. The three color chromaticity points of the CCIR REC XA/11 standard are adopted on the assumption that the color reproduction region 36 of the NTSC system is substantially in register with the region 31 indicated by the CCIR REC XA/11 standard of the HDTV system.

However, as shown in Table 2, the reference white colors in these standards are different, namely, the reference white for the NTSC system is 9300K+27MPCD (minimum perceptible color difference), while that for the HDTV system is $D_{65}$.

TABLE 2

| CHROMATICITY OF THREE COLOR | STANDARDS | | | |
| --- | --- | --- | --- | --- |
| | HDTV (CCIR) CHROMATICITY (x, y) | | CURRENT NTSC COORDINATES (x, y) | |
| | x | y | x | y |
| R | 0.640 | 0.330 | 0.640 | 0.330 |
| G | 0.300 | 0.600 | 0.290 | 0.600 |
| B | 0.150 | 0.060 | 0.150 | 0.060 |
| REFERENCE WHITE | 0.3127 | 0.3290 | 0.281 | 0.311 |
| | $D_{65}$ | | 9300K + 27MPCD | |

Meanwhile, the reference light $D_{65}$ is an ordinary daylight which is the CIE daylight having the relative color temperature of approximately 6504K inclusive of an ultraviolet region.

The difference in the reference white is plotted in the xy chromaticity diagram of FIG. 5. In this figure, the reference white of the NTSC system is at point a, while that of the CCIR REC XA/11 standard of the HDTV system is at a point b, in the xy chromaticity diagram.

Since the image signals have different reference white colors, it becomes necessary to effect color conversion in the color display apparatus when displaying image signals having plural different reference white colors on the receiving side, or when displaying image signals having image pickup characteristics associated with plural different reference white colors.

In a block diagram of FIG. 4, image signals having two different reference white colors, such as those of the current television standard system and the HDTV system, are entered to a single color display apparatus.

When the input signals with plural different reference white colors are displayed simultaneously by the one and the same color display apparatus, the display screen is divided for display. At this time, the color display apparatus transmits image signals to a color conversion section 21, which image signals are transmitted in association with the reference white colors responsive to the screen dividing information.

The color conversion section 21 effects real-time switching of the color converting operation for making a display in association with a reference white color provided as the new reference white color. By such color conversion, display may be achieved without color reproduction errors by the color display apparatus.

An arrangement for effecting color conversion of input image signals having plural different white colors for displaying plural pictures on one and the same color display screen is explained by referring to FIG. 4.

Three color signals R, G and B are entered via input terminal 20 to color converting section 21. The color converting section 21 is made up of an inverse correction circuit 22, color conversion matrix circuits 23, 24, a switch 25 and an inverse gamma correction circuit 26.

The inverse correction circuit 22 is a block circuit for effecting inverse correction of gamma characteristics of a television camera. The color conversion matrix circuits 23, 24 are provided with color matrix processors for effecting coefficient control of a color matrix processing based on the screen dividing information. These color matrix processors are adapted for effecting color conversion of image signals having plural different basic reference white colors or image signals having plural different image pickup characteristics at the receiving side. Output signals from the conversion matrix circuits 23, 24 are switched by switch 25 based on the screen dividing information before being supplied to the inverse gamma correction circuit 26.

The inverse gamma correction circuit 26 is adapted for effecting inverse correction of gamma characteristics of a display device.

The above mentioned three color signals R, G and B are supplied to the inverse correction circuit 22 for effecting inverse correction of the gamma characteristics within the color converting section 21 because the three color signals need to be reset to linear signals by effecting camera gamma correction $\Gamma_c^{-1}$. Outputs from the camera gamma inverse correction 22 are transmitted to color conversion matrix circuits 23, 24 constituted by color matrix processing circuits having coefficients for association with the respective color reproduction regions.

In the color conversion matrix circuit 23, if input signals associated with the color reproduction region recommended by CCIR REC XA/11 are transmitted to the receiving side with plural different reference white colors or with plural different image pickup characteristics, as will be explained subsequently, the coefficient stored in the circuit 23 may be outputted directly without the necessity of effecting color conversion. Thus the color conversion matrix circuit 23 effects color conversion with the conversion matrix constituted by the coefficients as a unit matrix. An output of the color conversion matrix circuit 23 is supplied to a terminal 25a of the switch 25 adapted for changing over the output signals of the color matrix processors depending on the screen dividing information.

The color conversion matrix circuit 24 also effects color conversion depending on the systems of the supplied signals. If image signals of image pickup characteristics having different reference white colors as will be explained subsequently or different reference white colors as prescribed by the current NTSC system and as recommended by CCIR REC XA/11 standard are supplied, the color conversion matrix circuit 24 effects color conversion so that the input signals of the NTSC system are adapted to the standard recommended by CCIR REC XA/11. An output of the color conversion matrix circuit 24 is outputted to a terminal 25b of switch 25 adapted to effect switching depending on the screen dividing information.

The switch 25 changes over the connecting state to the terminals 25a, 25b on the real time basis depending on the screen dividing information to supply the signals having camera gamma characteristics inversely corrected by the correction circuit 22 to the inverse gamma correction circuit 26 adapted for correcting inverse gamma characteristics of the display device, such as CRT. In FIG. 4, the switch 25 is shown in a state in which the terminal 25a is selected.

In the inverse gamma correction circuit 26 of the display device, inverse gamma characteristics $\gamma_D$ are applied to the signals for effecting correction with respect to the display device. The signals from the inverse gamma correction circuit 26 are supplied via output terminal 27 to the display device.

It is possible with the display device, thus supplied with signals converted in color in accordance with the screen dividing information, to display the signals on a screen, not shown, of the display device, without color reproduction errors.

The three color signals conforming to the HDTV system, outputted from the color conversion matrix circuit 24, are converted with respect to the colorimetric system by the formula (4) into the three color signals of the current NTSC system in the same manner as in the preceding embodiment.

$$\begin{bmatrix} R \\ G \\ B \end{bmatrix}_{HDTV\,(CCIR)} = \begin{bmatrix} 0.7838 & -0.0465 & 0.0000 \\ 0.0000 & 1.0545 & 0.0000 \\ 0.0000 & 0.0124 & 1.2213 \end{bmatrix} \begin{bmatrix} R \\ G \\ B \end{bmatrix}_{NTSC} \quad (4)$$

The conversion matrix coefficients in this case are respective components of the three-row three-column matrix shown at the right side of the formula (4).

In the case of a color display apparatus for displaying image signals having image pickup characteristics associated with plural different reference white colors, that is if different reference white colors, such as that at a point c of the reference white point of the NTSC system on the xy chromaticity diagram and that at a point d of the standard recommended by CCIR REC XA/11 of the HDTV system on the xy chromaticity diagram, are adopted for color reproduction, and image signals supplied to the same color display screen are color-reproduced, despite the fact that the three color signals R, G and B are of the same chromaticity, and the color reproduction region 37 is the same, as shown in FIG. 6, color reproduction errors are produced.

For removing these color reproduction errors, color conversion needs to be similarly effected based on the block construction shown in FIG. 4.

The color conversion is effected in the same manner as in the above described second embodiment. That is, outputs from the color conversion matrix circuits 23, 24 in the color conversion section 21 are selectively outputted by switch 25 to effect the color conversion. By such color conversion, the color reproduction errors produced on the screen may be eliminated so that color reproduction corresponding to the input image signals may be displayed on the same screen.

As may be seen from the foregoing examples, when the image signals having plural different reference white colors or image signals having image pickup characteristics associated with the plural different white colors are displayed simultaneously by e.g. the picture-in-picture type screen dividing technique, the outputs from switches 25a, 25b need to be switched based on the screen dividing information for selecting the coefficients for matrix processing for color reproduction of the supplied image signals on the same display apparatus without color reproduction errors.

What is claimed is:

1. A color display device for displaying image signals having image pickup characteristics associated with plural different color reproduction regions, said color display device comprising:
   color reproducing means having three color chromaticity points defining a new color reproduction region (34) at least as good as the broadest one of said plural different color reproduction regions and including at least all of the plural different color reproduction regions and a color converting section for associating the image signals with said color reproduction region (34);
   wherein said color converting section includes a color matrix processor having a pair of color conversion matrix circuits and switching means selecting one of said color conversion matrix circuits for control of color matrix processing coefficients based on screen dividing information.

2. A color display apparatus for displaying image signals having plural different reference white colors on the receiving side, said color display apparatus comprising:
   color display means having a color converting section (21) adapted for providing a new reference white color and displaying the image signals in association with said new reference white color;
   wherein said color converting section includes a color matrix processor having a pair of color conversion matrix circuits and switching means selecting one of said color conversion matrix circuits for control of color matrix processing coefficients based on screen dividing information.

3. A color display apparatus for displaying image signals having image pickup characteristics associated with plural different reference white colors, said color display apparatus comprising:
   color display means having a color converting section (21) adapted for providing a new reference white color and displaying the image signals in association with said new reference white color;
   wherein said color converting section includes a color matrix processor having a pair of color conversion matrix circuits and switching means selecting one of said color conversion matrix circuits for control of color matrix processing coefficients based on screen dividing information.

4. A color display apparatus as claimed in claim 1, 2, or 3 wherein said color converting section comprises a color matrix processor having variable coefficients.

5. A color display apparatus as claimed in claim 1, 2 or 3 wherein said color converting section comprises:
   an inverse correction section for inverse correction of gamma characteristics of a television camera,
   a color matrix processor with a variable coefficient, and
   an inverse correcting section for inverse correction of gamma characteristics of a display device.

* * * * *